United States Patent [19]
Muller et al.

[11] 3,731,882
[45] May 8, 1973

[54] APPARATUS FOR THE MANUFACTURE OF MOST FINELY PULVERIZED RED PHOSPHORUS

[75] Inventors: Fritz Muller, Knapsack near Cologne; Karl-Heinz Stendenbach, Bruehl-Pingsdorf; Franz-Josef Dany, Lechenich; Dieter Steidl, Sulzbach/Taunus; Horst Heinrich Weizenkorn, Efferen near Cologne; Willi Forst, Tiegen, all of Germany

[73] Assignee: Knapsack Aktiengesellschaft, Knapsack near Cologne, Germany

[22] Filed: Nov. 2, 1971

[21] Appl. No.: 194,883

Related U.S. Application Data

[62] Division of Ser. No. 860,275, Sept. 23, 1969, Pat. No. 3,628,739.

[52] U.S. Cl. ............... 241/46.15, 241/25, 241/172
[51] Int. Cl. ............................................. B02c 15/08
[58] Field of Search .................. 241/46.15, 171, 172

[56] References Cited

UNITED STATES PATENTS 3,432,109  3/1969  Geissel ........................... 241/172
3,486,705  12/1969  Szequari ......................... 241/172

Primary Examiner—Granville Y. Custer, Jr.
Attorney—Arthur G. Connolly et al.

[57] ABSTRACT

Production of most finely pulverized red phosphorus, by subjecting an aqueous suspension of red phosphorus with a particle size of between about 50 and 100 microns, produced inside a ball mill from yellow phosphorus and water, to pulverization with agitation to obtain particles with a size between 1 and 20 microns, for example 10 microns, prior to filtering the suspension. The red phosphorus is produced using an apparatus wherein preliminary reservoir tank, a preliminary tank and a device provided with an agitator and filled with glass balls of between 1 and 2 mm in diameter, are disposed ahead of the filter tank.

7 Claims, 3 Drawing Figures 3,731,882

APPARATUS FOR THE MANUFACTURE OF MOST FINELY PULVERIZED RED PHOSPHORUS

CROSS REFERENCE TO RELATED APPLICATIONS

This application is a divisional of U.S. Pat. application Ser. No. 860,275, filed Sept. 23, 1969 now U.S. Pat. No. 3,628,739, issued Dec. 21, 1971.

BACKGROUND OF THE INVENTION

The present invention relates to an apparatus for the manufacture of most finely pulverized red phosphorus, wherein an aqueous suspension of red phosphorus coming from a filter reservoir zone is conveyed to a filter zone and the resulting filter cake, partially freed from water in the filter zone, is introduced into a drying zone to be dried therein.

DESCRIPTION OF THE PRIOR ART

Attempts have most recently been made with the object of replacing glass wool and similar material by organic foam plastics as a heat-retaining material. The uses of these foam plastics are, however, rather limited for the time being bearing in mind that untreated polyurethane foam plastics, for example, are readily combustible and continue to burn once they have been ignited. This can be obviated using polyurethane with most finely pulverized red phosphorus therein, which is added thereto prior to foaming. Most finely pulverized red phosphorus is, however, impossible to produce by conventional methods. In addition thereto, it is impossible for dry red phosphorus to be pulverized further because of the inherent risk of explosion.

One of the processes customarily used to this effect comprises treating anhydrous yellow phosphorus in a closed ball mill and slowly heating it therein for hours to temperatures of about 260°C to effect exothermal transformation into red phosphorus. Following completion of the reaction, the grinding operation is continued, however, without supply of further heat. After cooling and following the addition of water, the material is ground again. The resulting suspension of red phosphorus in water travelling through a filter reservoir zone is pumped to a filter zone to produce a filter cake therein, which is conveyed and passed through a drying zone. The red phosphorus leaving that zone is the final product, which however has a relatively coarse particle size of more than 50 up to 100 microns and therefore is not adapted for use as a flame-retarding or flame-proofing addend to organic foam plastics producing a heat-retaining effect, particularly polyurethane foam plastics.

SUMMARY

The object of the present invention is to provide an apparatus which is free from the deficiencies reported above and enables most finely pulverized red phosphorus to be produced suitable for use, for example, as a flame-retarding or flame-proofing addend to organic foam plastics producing a heat-retaining effect, particularly foamed polyurethane. To this end, the invention substantially provides for an aqueous suspension of red phosphorus with a particle size between about 50 and 100 microns, produced inside a ball mill from yellow phosphorus and water, to be pulverized in a device provided with an agitator and filled with glass balls to reduce the particle size down to a preferred range of between 1 and 20 microns, for example 10 microns, prior to filtering the suspension. In this manner, it is possible to obtain a fully satisfactory process for most finely pulverized red phosphorus. More particularly, it is possible to produce most finely pulverized red phosphorus consisting of particles with a size of less than 10 microns.

The invention also provides for the suspension to be conveyed with agitation from a preliminary reservoir zone through a preliminary zone and an agitating grinding zone to a filter reservoir zone.

The invention also provides for the filter cake to be indirectly dried, using steam of about 150°C.

Still further, the invention provides for a portion of the suspension conveyed through the preliminary zone to be recycled to the preliminary reservoir zone. This is generally a very small suspension portion, namely that suspension portion from which red phosphorus is found to have precipitated in the preliminary zone, and is no longer fluidized by the agitator disposed therein.

The same is true concerning the filter zone from which a suspension portion is recycled to the filter reservoir zone, for reasons the same as those set forth above.

A conventional device of the type described above comprises in series arrangement a filter tank, a conveyor pump, a rotating filter with a scraper, a trough chain conveyor receiving the filter cake scraped off and a dish drier for drying the filter cake. This apparatus can be used for the production of red phosphorus with a particle size of more than 50 up to 100 microns, which however is not adapted for the uses described above, as already mentioned.

The apparatus of the present invention used for the production of most finely pulverized red phosphorus with a particle size of less than 10 microns comprises a filter tank having a preliminary reservoir tank, a preliminary tank and a device provided with an agitator and filled with glass balls of between 1 and 2 mm in diameter disposed ahed of the filter tank. Especially the said device enables the red phosphorus present in the aqueous phosphorus suspension to be extensively comminuted, i.e. pulverized in the aqueous phase. It is interesting to repeat here that it is imperative for red phosphorus to be ground while wet. It never can be ground while dry, for example downstream of the drier, as this would definitely result in explosions occasioned by reaction of red phosphorus with atmospheric oxygen, which is present at least in traces.

The present invention can also be modified by substituting a centrifugal filter, which is positioned between the filter tank and the drier and arranged to be series-connected to a buffer vessel, for the rotary filter to avoid cloggings that are sometimes occasioned by the extremely fine phosphorus.

Due to the thixotropic attitude of the filter cake, it is sometimes problematic to introduce the filter cake into the drier, using a valve or similar device, which may temporarily become clogged. To avoid this or obviate the occurrence of such difficulties, the invention also provides for a rotary piston pump to be positioned ahead of the drier's inlet opening. In accordance with a still further feature of the present invention it is advantageous for each of the two rotary pistons and the pump casing to be spaced about 0.5 to 3 mm, particularly 1 mm, apart so as to leave a gap therebetween. It is also possible for the rotary piston pump to be replaced with a worm pump.

The invention still further provides for red phosphorus which is found to have deposited in the lower portion of the preliminary tank and is no longer fluidized by the agitator therein, to be removed therefrom and recycled by means of a conduit connecting the preliminary tank to the preliminary reservoir tank and having a generally slightly opened outlet valve disposed therein. This enables deposited phosphorus to be continually returned to the preliminary reservoir tank.

For reasons the same as just described above, the invention also provides for the arrangement of a further conduit running from the rotary filter tank to the filter tank and having a generally slightly opened outlet valve therein.

In accordance with a still further feature of the present invention, the drier is a paddle screw drier fed with steam of about 150°C.

The most finely pulverized red phosphorus produced by the apparatus of the present invention is adapted for use as an addend to combustible organic foam plastics producing a heat-retaining effect, particularly polyurethane foam plastics. It is also adapted for use as an addend in the production of self-extinguishing or non-glowing thermoplastic moulding materials based on polyvinyl chloride or styrene-acrylonitrile copolymers or butadine-styrene-acrylonitrile copolymers. Still further, it is possible for the red phosphorus produced in accordance with the present invention to be used for the coating of striking surfaces, particularly for matches.

EXAMPLE 1: (Comparative Example)

A suspension of about 25 weight percent red phosphorus in water was pumped from a filter tank to a rotary filter tank. The filter cake having about 30 weight percent water herein, scraped off from the drum of a rotary filter, was delivered to a trough conveyor maintained under nitrogen, and conveyed from there to a shelf drier maintained under nitrogen. Anhydrous red phosphorus having approximately the following particle sizes was removed from the drier:

80 % < 40 microns
55 % < 25 microns
30 % < 10 microns.

The rotary filter tank was required to be freed after some hours from red phosphorus which was found to have deposited therein.

EXAMPLE 2: (Process of invention)

A suspension of about 35 weight percent red phosphorus in water was pumped from a preliminary reservoir tank to a preliminary tank provided with an intense stirrer. Phosphorus which precipitated in the bottom portion of the preliminary tank was continually withdrawn through a slightly opened valve and recycled to the preliminary reservoir tank. Overflow material coming from the preliminary tank was also recycled to the preliminary reservoir tank.

By means of a worm pump the suspension was conveyed from the preliminary tank to a device provided with an agitator and filled with glass balls, and forced to flow upwardly therethrough. The wet-ground suspension was then delivered to a filter tank and pumped from there to a rotary filter tank. This tank had a throttle valve disposed in its bottom portion, which effectively avoided the deposition of red phosphorous; an overflow was used to maintain the depth of immersion of the filter drum constant. The filter cake scraped off contained about 30 percent adhering water and was delivered to a paddle worm drier having nitrogen therein. Anhydrous red phosphorus was discharged therefrom. 97 to 100 percent of the phosphorus was found to have a particle size of < 10 microns, depending on the quantity of suspension fed to the devide provided with an agitator and filled with glass balls.

BRIEF DESCRIPTION OF THE DRAWINGS

Two exemplary representations of the present invention are shown diagrammatically in the accompanying drawings. Needless to say the invention is in no way limited thereto. It can be modified in various ways without departing from its scope. In the accompanying drawings.

DESCRIPTION OF THE PREFERRED EMBODIMENT

Figures 1, 1A:
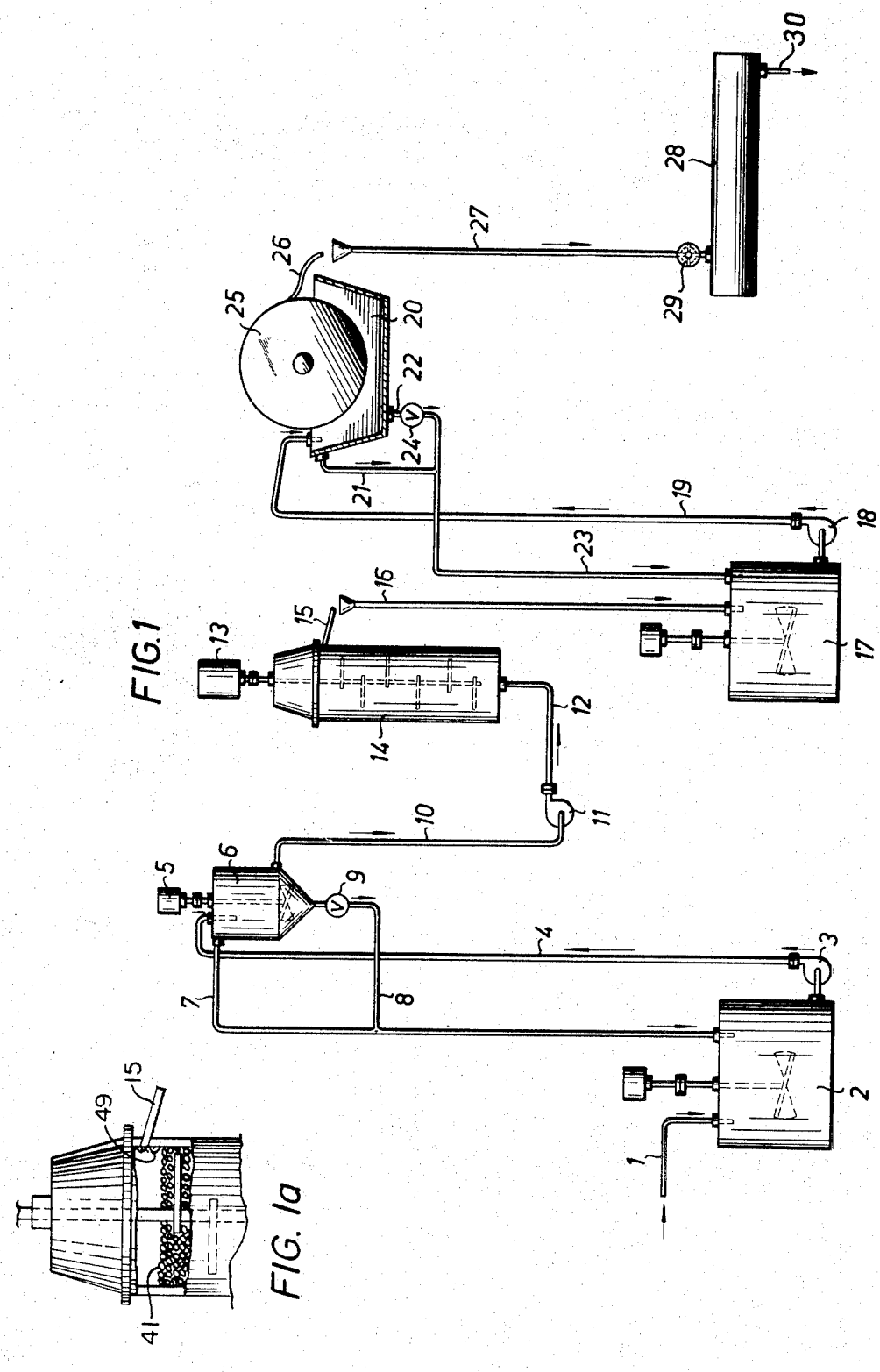
FIG. 1 is an exemplary representation of the invention.
FIG. 1a shows a detail of the agitator device.

As can be seen, feed line 1 is used to supply and at least partially fill preliminary reservoir tank 2, which has an agitator connected to it, with the phosphorus-water-suspension. Pump 3 serves to convey the suspension through line 4 to preliminary tank 6, which is equipped with an agitator 5 and connected to preliminary reservoir tank 2 by means of an overflow line 7 and a discharge pipe 8. Discharge pipe 8 has a discharge valve 9 disposed therein, which generally is but slightly opened. This is done to make it possible for red phosphorus, which precipitates in the lower portion of preliminary tank 6 and is no longer fluidized by agitator 5, to be returned to preliminary reservoir tank 2. The suspension travels from preliminary tank 6 through line 10 and is pumped by means of pump 11 through line 12 to a device 14 (for example as shown in U.S. Pat. No. 3,432,109) provided with an agitator 13 and filled with glass balls 41 which are 1 to 2 mm in diameter. The suspension coming from device 14 flows through a sieve 49 placed in front of discharge pipe 15 and is conveyed through pipe 16 to filter tank 17 having an agitator connected to it. By means of a pump 18 and a line 19 the suspension is pumped to rotary filter tank 20, which has an overflow pipe 21 and a discharge pipe 22 connecting rotary filter tank 20 through line 23 to filter tank 17. Discharge pipe 22 has a discharge valve 24 disposed in it, which generally is but slightly opened.

The filter cake obtained in the rotary filter drum 25 is scraped off by means of a scraper 26 and delivered through down pipe 27 and rotary piston pump or worm pump 29 to drier 28. Drier 28 advantageously is a paddle worm drier and is fed with steam of about 150°C. Dry red phosphorus is removed from drier 28 through outlet opening 30.

Figure 2:
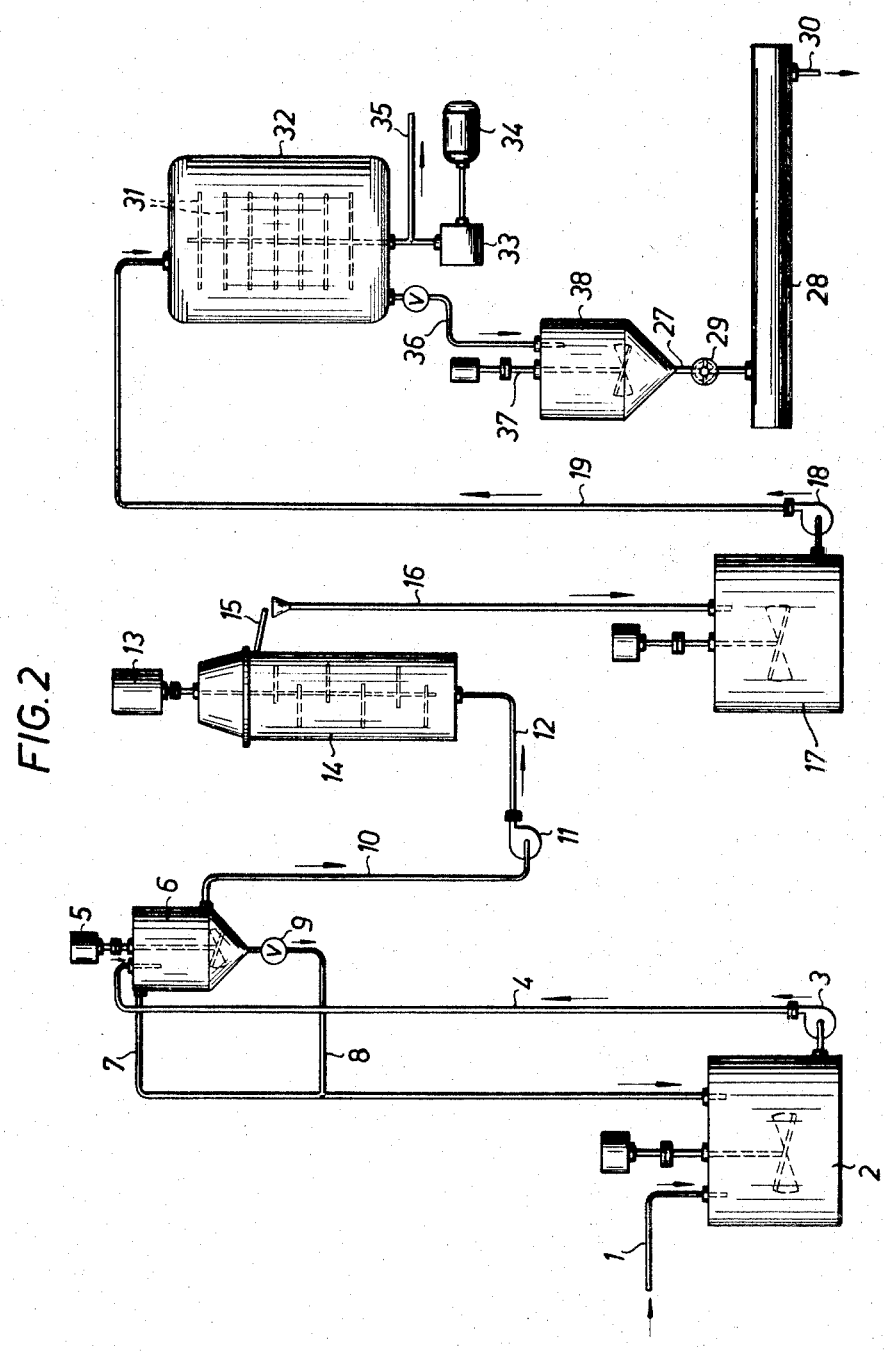
FIG. 2 is a further exemplary representation of the invention.

In accordance with the preferred representation shown in FIG. 2, line 19 is arranged to be connected to a centrifugal filter 32 with plates 31. The centrifugal filter 32 is arranged to be driven by a motor 34 through a transmission 33. Positioned below centrifugal filter 32 is a filtrate outlet 35. Line 36 is used to convey the filter cake from centrifugal filter 32 to a buffer tank 38 connected to agitator 37. From buffer tank 38, the filter cake is delivered through line 27 and a rotary piston pump or worm pump 29 to drier 28. The rotary piston pump preferably is a pump wherein each of the two rotary pistons and the pump casing are arranged to be spaced about 0.5 to 3 mm, preferably 1 mm apart, leaving a gap therebetween.

We claim:

1. In an apparatus for the production of most finely pulverized red phosphorus comprising a filter tank receiving an aqueous phosphorus suspension, a rotating filter means arranged downstream thereof and having means for forming and discharging a filter cake of said finely pulverized red phosphorus, and a drier for drying the filter cake discharged from the rotating filter means, the improvement according to which a preliminary reservoir tank fitted with an agitator is arranged substantially upstream of the rotating filter means; a preliminary tank provided with an agitator is connected to the preliminary reservoir tank by means of a conduit having a generally slightly opened discharge valve disposed therein; and a grinding device provided with an agitator and filled with glass balls of between 1 and 2 mm in diameter is located between, and connected to, the preliminary tank and the filter tank.

2. The apparatus as claimed in claim 1 wherein the rotating filter means and the filter tank being connected together by means of a conduit having a generally slightly opened discharge valve therein.

3. The apparatus as claimed in claim 1, wherein a rotary double piston pump is positioned ahead of the drier's inlet opening.

4. The apparatus as claimed in claim 1 wherein the rotating filter means comprises a filter drum in a rotating filter tank with a scraper operatively arranged to remove the filter cake from said filter drum.

5. The apparatus as claimed in claim 1, wherein a worm pump is positioned ahead of the drier's inlet opening.

6. The apparatus as claimed in claim 1, wherein the drier is a paddle screw drier fed with steam of about 150°C.

7. The apparatus as claimed in claim 1 wherein the rotating filter means comprises a centrifugal filter series-connected to a buffer vessel disposed between the filter tank and the drier.

* * * * *